United States Patent [19]
Townsend

[11] 3,922,357
[45] Nov. 25, 1975

[54] METHOD FOR INJECTING FLUIDS INTO MEAT PRODUCTS

[75] Inventor: Ray T. Townsend, Des Moines, Iowa

[73] Assignee: Townsend Engineering Company, Des Moines, Iowa

[22] Filed: Apr. 16, 1973

[21] Appl. No.: 351,541

[52] U.S. Cl. .................................. 426/281; 99/533
[51] Int. Cl.² ......................................... A22C 17/00
[58] Field of Search .......... 426/281, 323, 332, 382, 426/371, 58; 99/532, 533, 534, 535

[56] References Cited
UNITED STATES PATENTS

| | | | |
|---|---|---|---|
| 3,338,150 | 8/1967 | Nordin | 426/281 X |
| 3,590,721 | 7/1971 | Hoffman | 426/281 X |

Primary Examiner—A. Louis Monacell
Assistant Examiner—R. A. Yoncoskie
Attorney, Agent, or Firm—Zarley, McKee, Thomte & Voorhees

[57] ABSTRACT

A method for injecting fluids into meat products comprising intermittently moving a meat product adjacent to and past a fluid injector needle means comprised of a plurality of fluid injector needles, penetrating the needles of said fluid injector means into said meat product between the periods of intermittent movement of the meat product, injecting fluid into the meat product while the needles are penetrating therein, coordinating the increments of movement of the meat product with the effective width of the fluid injector needle means past which the meat product moves so that the effective penetration area of said meat product initially penetrated by the fluid injector needle means will at least partially overlap the effective penetration area of the meat product penetrated by the fluid injector needle means after the next successive movement of the meat product.

5 Claims, 16 Drawing Figures

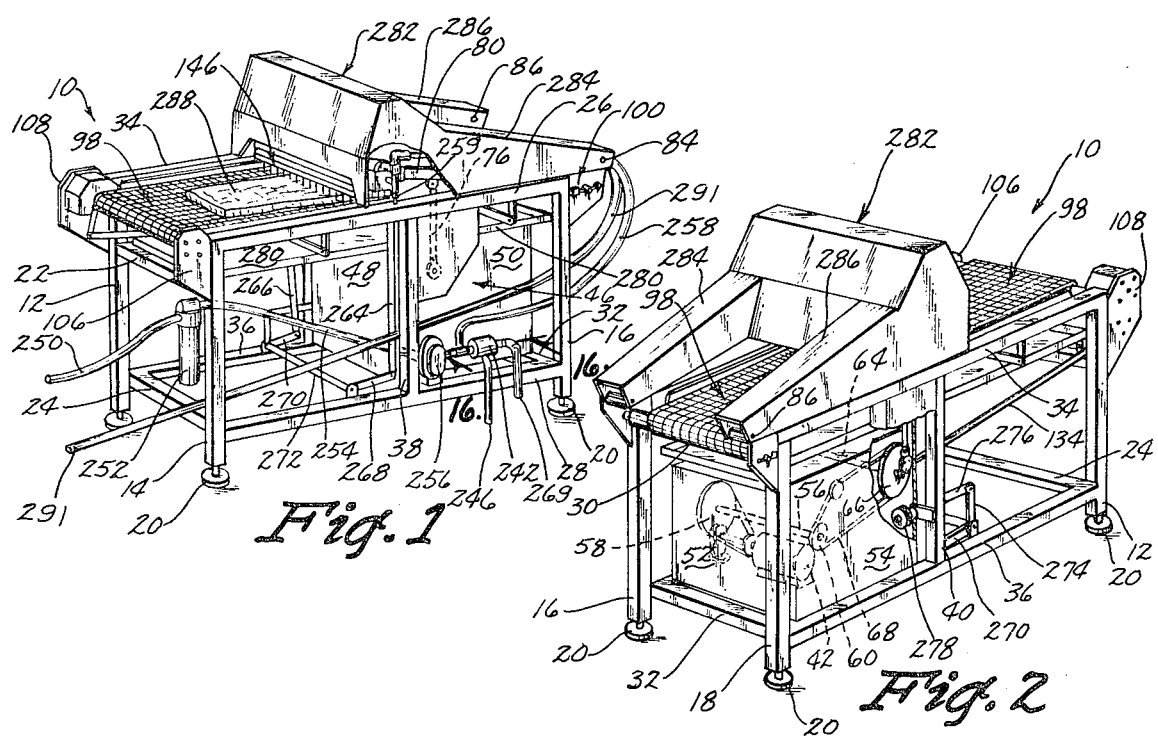
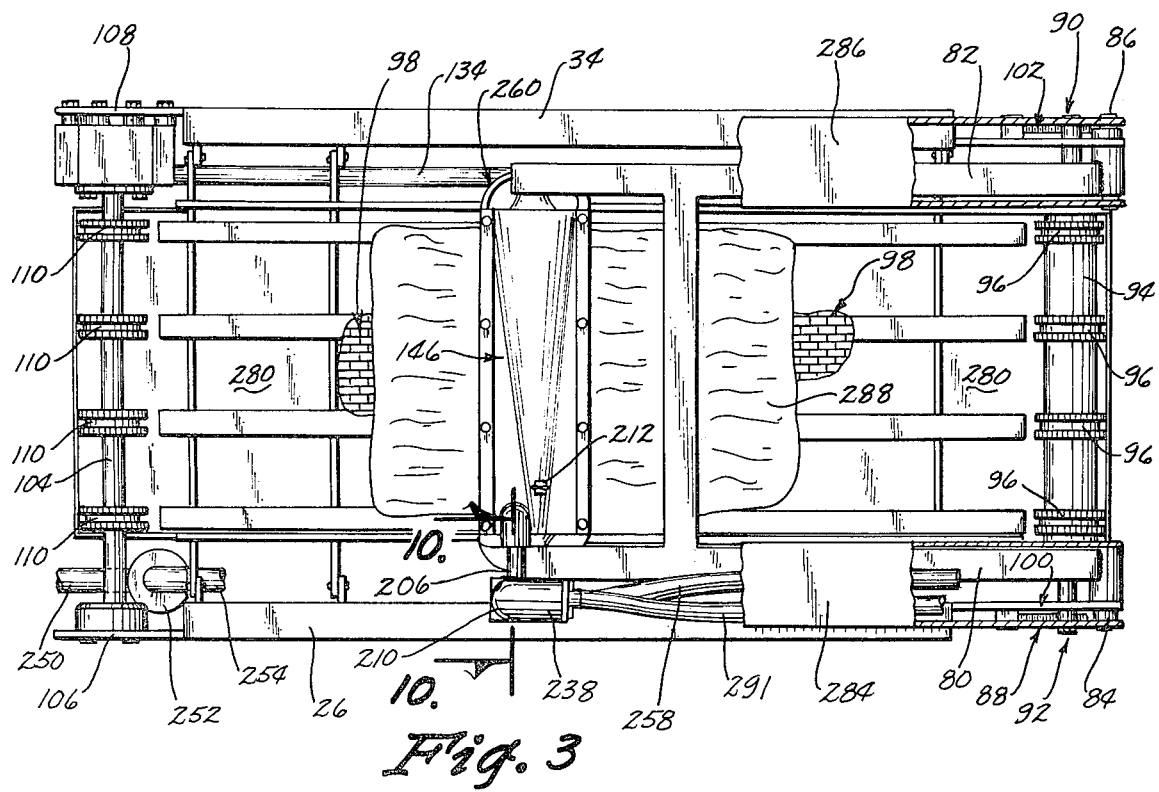

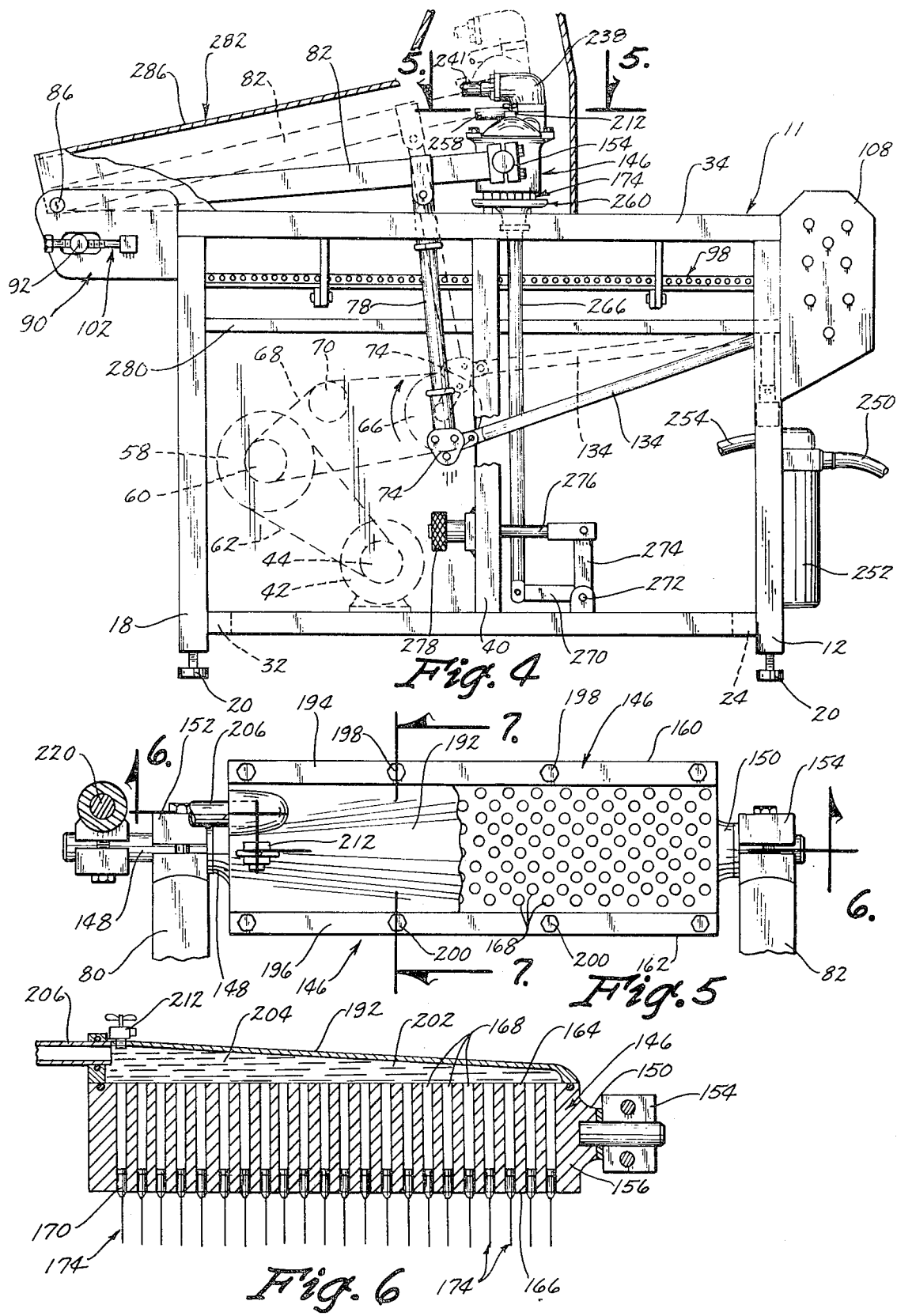

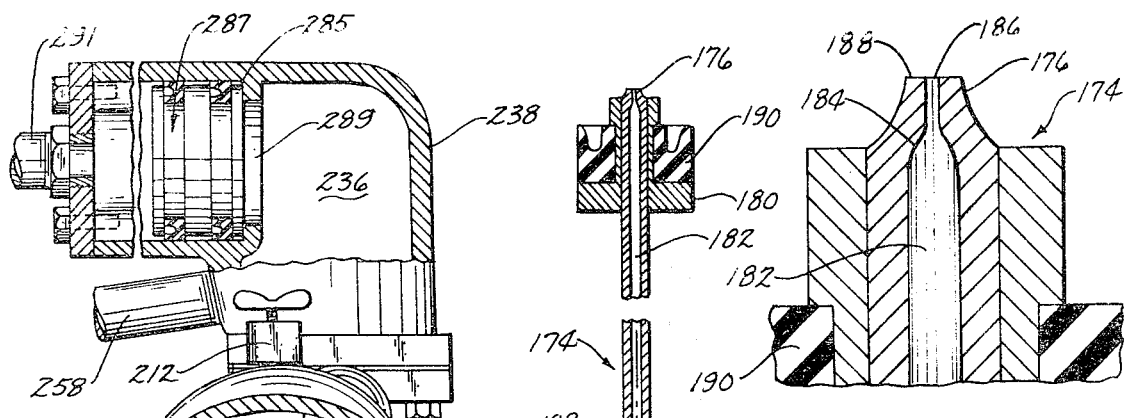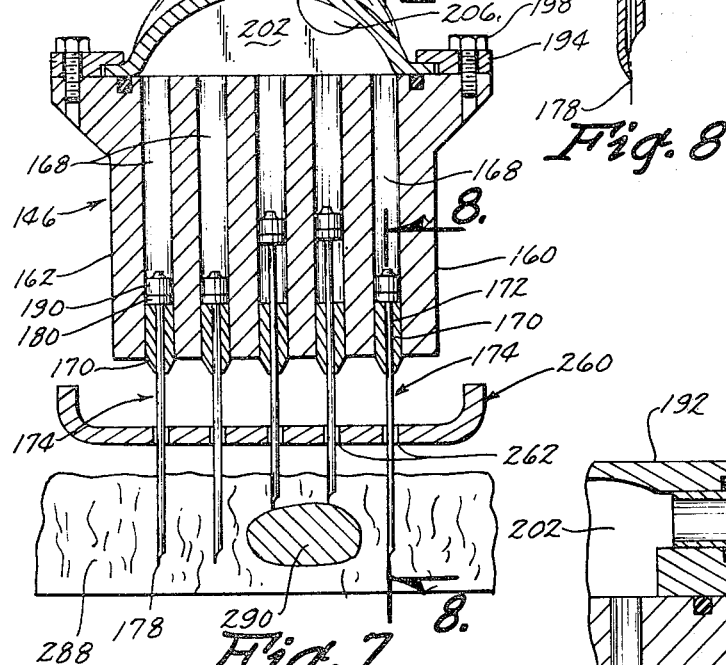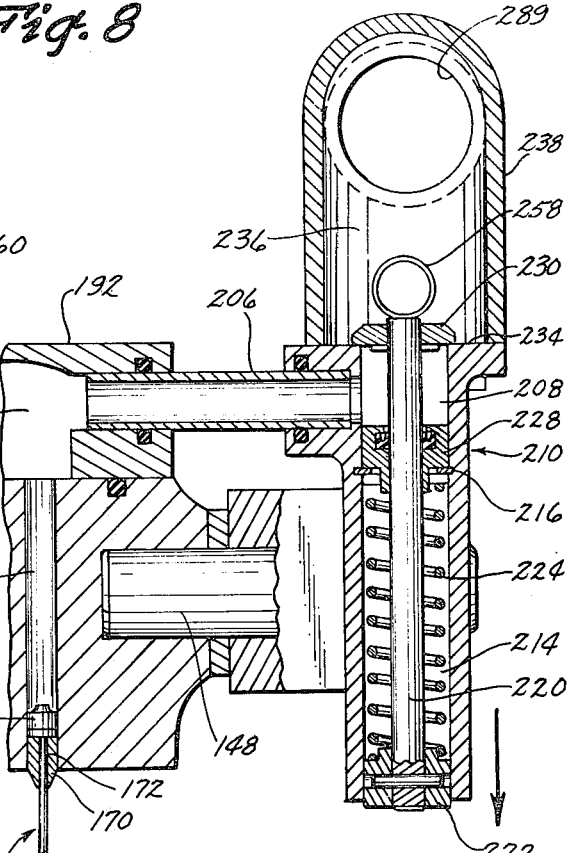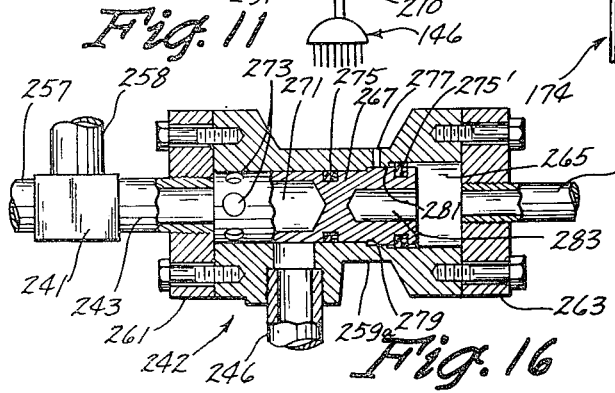

METHOD FOR INJECTING FLUIDS INTO MEAT PRODUCTS

Fluid injector machines are utilized to inject fluids such as pickling brines, flavoring additives, etc., into meat products. The pickling brines are injected into certain meat products such as pork bellies, bone-end hams, boneless hams, boneless pork butts, jowls, bacon squares, etc., to cure the same. Additionally, certain other fluids are injected into various meat products for such purposes as protein alteration, flavoring, etc.

Heretofore, the fluid injector machines generally employed a plurality of reciprocal injector needles when pierced the meat so as to inject the fluid thereinto. In those machines, fluid was continually pumped through the needles which resulted in considerable fluid being spilled when the needles were not penetrating the meat product. An attempt was made to reduce the amount of wasted fluid by collecting the spilled fluid and recirculating the same through the fluid pump for subsequent use. The spilled fluid picked up blood and particles of meat which resulted in the particles accumulating in the pump and also resulted in the needles becoming plugged. Government regulations pertaining to such meat processing requires that the pumps, hoses, etc., of those machines be disassembled every few hours so that the interiors thereof could be cleaned to eliminate the possibility of bacteria or the like from forming therein. It can be appreciated that the fluid pumps and hoses of those machines is an ideal place for bacteria or the like to be harbored, due to the meat particles, blood, etc. accumulating therein. Thus, the machines referred to above have a great deal of "down" time since they must be constantly disassembled for cleaning.

Additionally, the machines referred to above do not provide any convenient means for shutting off the flow of fluid through the injector needles that are not being used for a particular product run.

Therefore, it is a principal object of this invention to provide a method for injecting fluid into meat products.

A further object of this invention is to provide a method for injecting fluid into meat products so that fluid can be uniformly injected throughout the meat product.

A further object of this invention is to provide a method for injecting fluid into meat products wherein fluid is discharged from the injector needles only when the injector needles have been lowered into piercing position.

A further object of this invention is to provide a method for injecting fluid into meat products wherein the meat product has needles injected therein at closely positioned points so as to insure the complete and uniform introduction of fluid into the meat product.

FIG. 1 is a front perspective view of a machine upon which the method is practiced with portions thereof cut away to more fully illustrate the invention.

FIG. 2 is a rear perspective view of the machine.

FIG. 3 is a top view of the machine with portions of the machine cut away to fully illustrate the invention.

FIG. 4 is a side elevational view of the machine.

FIG. 5 is an enlarged sectional view as seen along lines 5—5 of FIG. 4 with portions thereof broken away to more fully illustrate the invention.

FIG. 6 is a sectional view as seen along lines 6—6 of FIG. 5.

FIG. 7 is an enlarged sectional view as seen along lines 7—7 of FIG. 5 illustrating the injector needles piercing a meat product.

FIG. 8 is an enlarged sectional view of an injector needle as seen along lines 8—8 of FIG. 7.

FIG. 9 is a partial sectional view of an injector needle.

FIG. 10 is an enlarged sectional view as seen along lines 10—10 of FIG. 3.

FIG. 11 is a schematic view of the fluid circuit of this invention.

FIG. 16 is a sectional view of the check valve of this invention as seen along lines 16—16 of FIG. 1.

Figure 12:
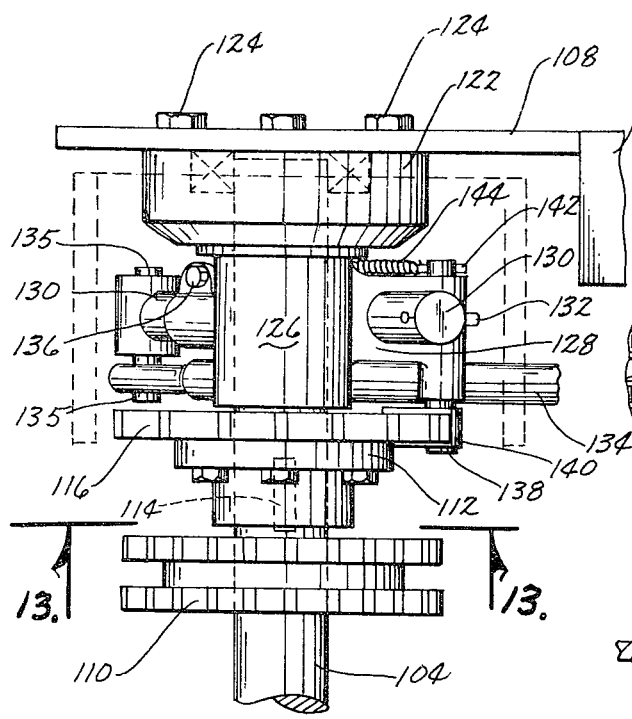
FIG. 12 is a top view of the ratchet means for driving the conveyor.

The injector machine upon which the method of this invention is practiced is generally designated by the reference numeral 10 comprising generally a table 11. Table 11 is provided with vertical legs 12, 14, 16 and 18 having suitable leveling devices 20 on their lower ends. Braces 22 and 24 extend between legs 12 and 14 while braces 26 and 28 extend between legs 14 and 16. Braces 30 and 32 are secured to and extend between legs 16 and 18 and legs 12 and 18 have braces 34 and 36 secured thereto and extending therebetween. A vertical brace 38 is secured to and extends between braces 26 and 28 (FIG. 1) and brace 40 is secured to and extends between braces 34 and 36 (FIG. 2).

An electric motor 42 is mounted on a support extending between braces 28 and 36 and has a drive pulley 44 provided thereon. As seen in FIGS. 1 and 2, a housing 46 is positioned on the machine comprising housing walls 48, 50, 52 and 54. Shaft 56 has its opposite ends rotably mounted on housing walls 50 and 54 and has spaced apart pulleys 58 and 60 mounted thereon for rotation therewith. Drive belt 62 extends around and between pulleys 44 and 58 to permit motor 42 to drive shaft 56.

Shaft 64 is rotably mounted on housing walls 48 and 54 and extends outwardly therefrom in a plane above shaft 56. Shaft 64 has a pulley 66 mounted thereon which receives a drive belt 68 extending from pulley 60. An idler pulley 70 is also provided to permit the tension in belt 68 to be adjusted.

Figure 14:
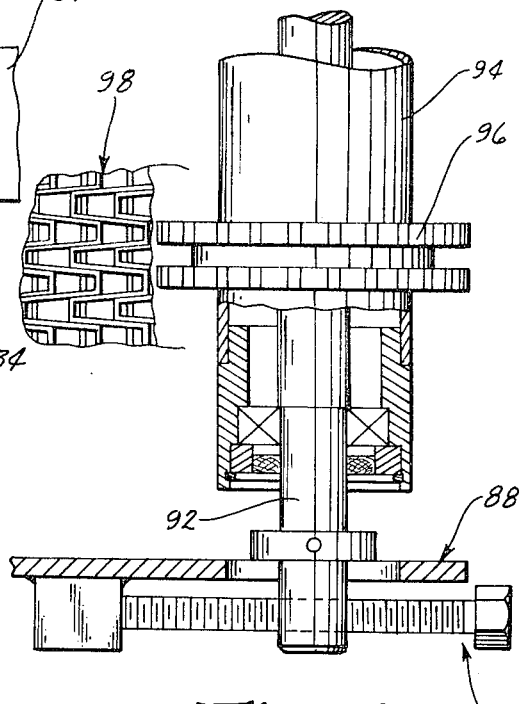
FIG. 14 is a partial sectional view illustrating the manner in which one end of the conveyor is adjustably supported.

Eccentrics 72 and 74 are provided on the opposite ends of shaft 64 and have length adjustable turnbuckle type rods 76 and 78 pivotally secured thereto respectively. The numerals 80 and 82 refer to arms which are pivotally connected intermediate their ends to the upper ends of rods 76 and 78 respectively. The lower ends of arms 80 and 82 are pivotally mounted on shafts 84 and 86 respectively which are rotably supported on extensions 88 and 90 respectively. Roller shaft 92 extends through and between extensions 88 and 90 and has a roller 94 mounted thereon including sprockets 96 adapted to engage and support an endless conveyor chain means 98 extending therearound which is comprised of a plurality of chain links connected together as illustrated in FIG. 14. Shaft adjustment means 100 and 102 are secured to the opposite ends of shaft 92 to permit the tension of chain means 98 to be adjustably varied. The other end of the conveyor chain means 98 is supported by shaft 104 which is rotatably supported on extensions 106 and 108. As seen in FIG. 3, shaft 104 includes sprockets 110 which engage the chain means 98 in conventional fashion.

The means for driving the chain means 98 is shown in detail in FIG. 12. As seen in FIG. 12, shaft 104 has a plate 112 keyed thereto by key 114. Ratchet wheel 116 is secured to plate 112 by screws 118 and includes a plurality of spaced apart driving ratchet teeth 120. Shaft 104 has a bearing means 122 mounted on its one end which is secured to extension 108 by bolts 124 (FIG. 12).

Figure 13:
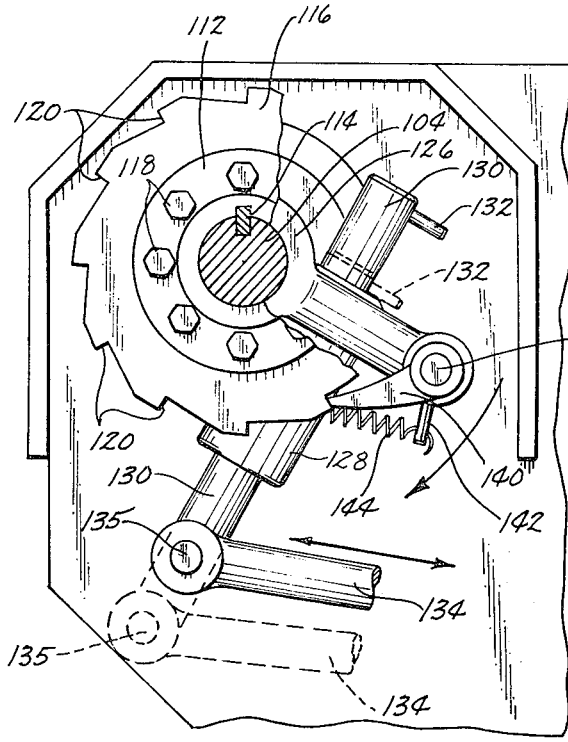
FIG. 13 is a sectional view as seen along lines 13—13 of FIG. 12 with portions thereof cut away to more fully illustrate the invention.

Collar 126 rotatably embraces shaft 104 between bearing means 122 and ratchet wheel 116 and has a sleeve portion 128 connected thereto which extends downwardly therefrom (FIG. 13). Shaft 130 extends through sleeve portion 128 as illustrated in FIGS. 12 and 13 and has a stop pin 132 extending through its upper end. The lower end of shaft 130 is pivotally connected to one end of rod 134 by pin 135. Rod 134 is pivotally connected at its other end to eccentric 74. Shaft 130 is selectively adjustably movable in sleeve 128 by means of a clamp portion 136 provided thereon. The relative position of shaft 130 with respect to sleeve 128 may be selectively changed when clamp portion 136 is loosened. When tightened, clamp portion 136 clamps onto shaft 130 and prevents movement thereof with respect to sleeve 128. Pin 132 prevents the shaft 130 from dropping out of sleeve 128 when the clamp portion 136 is loosened.

Shaft 138 is rotatably mounted on sleeve 128 as illustrated in FIG. 13 and has a dog 140 secured thereto at one end thereof adapted to engage the teeth 120 and rotate the ratchet wheel 116 in one direction (clockwise) when rod 134 is moved to the left as viewed in FIG. 13. Finger 142 is secured to the other end of shaft 138 and has a spring 144 secured at one end thereto. The other end of spring 144 is secured to sleeve 128 to bias the dog 140 into engagement with the teeth 120 as rod 134 is moved to the left (FIG. 13) and to permit the dog 140 to ratchet over the teeth 120 when the rod 134 is moved to the right as viewed in FIG. 13.

The numeral 146 generally designates an injector manifold which is secured to the ends of arms 80 and 82. Manifold 146 has a pair of outwardly extending stubs 148 and 150 which are secured to the ends of arms 80 and 82 by caps 152 and 154 respectively. Manifold 146 includes opposite ends 156 and 158, sides 160 and 162, top 164 and bottom 166. Manifold 146 has a plurality of closely spaced vertical bores 168 formed therein. The bores 168 are preferably arranged in rows as illustrated in FIG. 5 so that the bores in each row are spaced approximately three-quarters of an inch from the bores in the same row, each bore being spaced approximately three-eighths inch from the bores in the adjacent row.

The lower ends of each of the bores 168 have a needle support 170 mounted therein having a bore 172 extending therethrough. An injector needle 174 is slidably mounted in each of the bores 168 comprising generally an upper end 176, lower end 178 and an outwardly extending shank portion 180. Needle 174 includes a bore 182 extending therethrough, the upper end of which tapers at 184 as illustrated in FIG. 9 to provide an orifice 186 which is considerably smaller than the diameter of the bore 182. As shown in FIG. 9, the area 188 around orifice 186 is very small to prevent the crystallization of salts around the orifice. Seal 190 embraces needle 174 above shank 180 and sealably engages the wall surface of the bore 168 to prevent fluid leakage therearound.

An arcuate manifold cover 192 is secured to manifold 146 by means of plates 194 and 196 and bolts 198 and 200 as illustrated in FIGS. 5 and 7. Cover 192 is provided with a tapered compartment area 202 (FIG. 6) which has a progressively decreasing volume from end 158 to end 156 so that the fluid 204 will be supplied substantially equally to each of the bores 168. One end of pipe 206 is in communication with compartment 202 while the other end thereof is in communication with compartment 208 of valve 210. As illustrated in FIG. 6, an air relief valve 212 is provided on manifold cover 192 and is designed to permit a small flow of air outwardly therethrough. Valve 212 has a one-way check valve mechanism therein so as to prevent air from being drawn therethrough into compartment 202. Preferably, air relief valve 212 permits the escape of air from compartment 202 up to approximately 1 pound per square inch.

Figure 15:
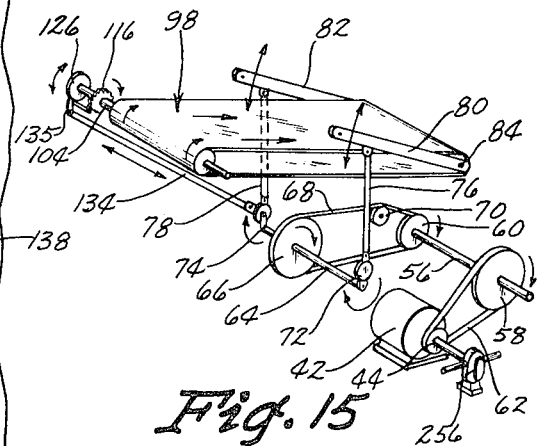
FIG. 15 is a partial perspective view illustrating the power train of the invention.

Valve 210 includes a vertically disposed bore 214 extending downwardly from compartment 208 and having a rod 220 movably mounted thereon. Rod 220 has a piston 222 on its lower end which vertically slides in the bore 214 and which is biased downwardly to the position of FIG. 10 by a spring 224 the upper end of which engages a snap ring spring keeper 216. Seal 228 embraces rod 220 in the manner seen in FIG. 10 to prevent the escape of fluid from compartment 208 into compartment 214. Valve member 230 is secured to the upper end of rod 220 by any convenient means and is adapted to sealably engage the surface 234 of valve 210 to prevent the flow of fluid from compartment 236 to compartment 208 when in the position of FIG. 10. Compartment 236 is defined by the dome 238 provided on the valve 210. Compartment 236 of dome 238 is fluid connected to a T-shaped fitting 241 by a hose or pipe 258. Fitting 241 is connected to a check valve 242 by pipe 243. Pipe 246 connects check valve 242 with fluid reservoir 248. Pipe 250 or other suitable conduit connects reservoir 248 to a filter 252 as illustrated in FIG. 11. Hose 254 or the like connects filter 252 with a fluid pump 256 which is fluidly connected to the fitting 241 by pipe 257. Pump 256 is driven by its connection with motor 42 as seen in FIG. 15. Pump 256 is operated continually throughout the operation of the machine as will be described later while check valve 242 serves as a relief valve designed to permit recirculation of the fluid back to the reservoir 248 when valve member 230 is seated on surface 234 and upon a predetermined pressure being attained in compartment 236. The numeral 259 refers generally to a vertically adjustable pin which is secured to the machine in the path of rod 220 adapted to engage and move the rod 220 upwardly in bore 214 to open valve member 230 when the arms 80 and 82 have lowered the manifold 146 and valve 210 to the position illustrated by solid lines in FIG. 4.

The details of check valve 242 are shown in FIG. 16 where it can be seen that the check valve 242 comprises generally a body portion 259a having end caps 261 and 263 secured thereto. Body portion 259a has a bore 265 extending therethrough which has a plunger 267 movably mounted thereon. One end of bore 265 is in communication with pipe 243 which is secured to end cap 261 while the other end of bore 265 is in communication with pipe 269 which is secured to end cap 263. Pipe 269 is secured to a source of compresssed air having a predetermined pressure. Plunger 267 has a bore 271 extending into one end thereof as shown in FIG. 16. A plurality of radially extending ports 273 extend outwardly from bore 271 through plunger 267 to permit communication between bore 271 and pipe 246 which is secured to body portion 259 as shown in FIG. 16. Plunger 267 is provided with spaced apart seals 275 and 275' which sealably engage the wall surface of bore 265. Body portion 259 is provided with an exhaust port 277 which provides communication between the atmosphere and bore 265 to vent air and fluid leakage in a breathing manner as the plunger moves. As seen in FIG. 16, plunger 267 is provided with an enlarged diameter portion at one of its ends thereby defining a shoulder 279. Shoulder 279 is adapted to engage shoulder 281 of bore 265 when plunger 267 is in the position of FIG. 16. Plunger 267 has a bore 283 extending into its other end to provide an air chamber at one end of the plunger.

As seen in FIG. 7, dome 238 includes a cylinder shaped chamber 285 having a piston 287 movably mounted therein. One end of chamber 285 has an opening 289 communicating with compartment 236 while the other end of chamber 285 is in communication with an air pipe 291 which is connected to a source of compressed air having a predetermined pressure.

The numeral 260 generally refers to an adjustable stripper plate which is selectively spaced above the conveyor chain means 98 and extends transversely with respect thereto. Plate 260 is provided with a plurality of openings 262 formed therein each of which receive one of the needles 174 extending therethrough as seen in FIG. 7. The opposite sides of plate 260 are secured to the upper ends of arms 264 and 266 respectively which extend downwardly therefrom. The lower ends of arms 264 and 266 are pivotally connected to one end of arms 268 and 270 respectively. Shaft 272 is rotatably mounted on and extends between braces 28 and 36 (FIG. 1). The other ends of arms 268 and 270 are rigidly secured to shaft 272 so that arms 264 and 266, and hence stripper plate 260, will either be raised or lowered depending upon the direction of rotation of shaft 272. Arm 274 is rigidly connected to one end of shaft 272 and has an adjustment rod 276 secured to the upper end thereof as shown in FIG. 4. Rod 276 extends through brace 40 and has an adjustment nut 278 threadably mounted thereon to permit the selective positioning of rod 276 with respect to the brace 40 which causes the stripper plate 260 to be selectively positioned over the chain means 98.

A fluid collection trough 280 is supported beneath the conveyor chain means 98 and is adapted to collect excess or spilled fluid. A suitable drain hose is connected to the trough 280 for draining the fluid collected thereon to a suitable floor drain or the like. The numeral 282 refers generally to a shield or cover which extends over a portion of the machine as illustrated in FIGS. 1 and 2. Preferably, the end portions 284 and 286 of cover 282 are suitably pivotally connected to the shafts 84 and 86 respectively to permit the entire cover to be easily pivotally moved with respect to the machine for cleaning and servicing purposes.

The normal method of operation is as follows. The motor 42 and pump 256 are energized which causes the fluid to be supplied to the valve 210 while the conveyor chain means 98 is moved on the table. Rotation of shaft 64 by the motor 42 causes the rod 134 to be reciprocated in the direction illustrated by arrows in FIGS. 13 and 15 so that dog 140 will cause the ratchet wheel 116 to be successively moved in increments which in turn causes the conveyor chain means 98 to be moved in successive increments rather than at a constant and continuous manner. As previously stated, the amount of each successive movement of the conveyor chain means 98 may be varied by changing the relationship of the shaft 130 with respect to the sleeve portion 128 which will vary the stroke of the sleeve 128. The rotation of shaft 64 by the motor 42 as illustrated in FIG. 15 will cause the eccentrics 72 and 74 to reciprocate the arms 80 and 82 in the direction of the arrows as illustrated in FIG. 15 and as illustrated in FIG. 4. In FIG. 4, the arm 82 is shown in its lower most position while the phantom or broken lines generally depict the arm 82 in substantially its upper position with respect to the conveyor chain means. When the arms 80 and 82 are in their raised position, manifold 146 is positioned so that the needles 174 are positioned above the stripper plate 260. As the arms 80 and 82 are reciprocated downwardly, the needles 174 move through the openings 262 in the stripper plate 260 and engage the meat product 288 as illustrated in FIG. 7. FIG. 7 illustrates the meat product 288 as including a bone 290 which is engaged by some of the injector needles. When the injector needles engage a bone or the like, the needles may slidably move upwardly in their bores 168 as illustrated in FIG. 7 which prevents damage to the needle. The needles will only move upwardly in the bores 168 upon engagement of a bone or the like since the fluid pressure thereabove maintains them in their normal extended position. The small area 188 around the orifice 186 of the needles 174 is such that salt crystallization thereon is prevented which eliminates the possibility that the orifice may become plugged. Additionally, the tapered surface 184 is designed so as to provide as extremely small orifice 186 at the upper end of the bore 182 so that if a foreign particle enters orifice 186, it will not become caught in the bore 182 since the bore tapers outwardly from the small orifice 186 to the larger bore portion immediately below the tapered portion 184. If the bore 182 had a constant diameter from its lower to upper ends, the possibility would exist that particles entering the upper end of the bore 182 could become clogged or caught in the bore.

The upward movement of the arms 80 and 82 causes the manifold 146 to be raised from the position of FIG. 7 which causes the needles 174 to be withdrawn from the meat product 288. The stripper plate 260 serves to prevent the meat product 288 from moving upwardly with the needles and provides a means for stripping the needles from the meat. Thus, for each increment of movement of the conveyor chain means 98, the manifold 146 is lowered so that the needles 174 will pierce the meat product 288 which insures that the meat product will be properly injected throughout its entire area. The fact that the manifold 146 has an easily removable maniflod cover 192 permits various covers to be fabricated for the manifold 146 to permit various of the bores 168 to be closed for particular product runs. For example, if a product run is being made wherein the product is extremely narrow, a manifold cover 192 would be installed on the manifold 146, the cover 192 having means thereon to close the bores 168 at the opposite ends of the manifold 146 so that fluid would not be supplied to the needles not ordinarily being used.

It is preferred that the conveyor chain means 98 be moved in increments corresponding to approximately one-half of the width of the needle area plus or minus one-fourth inch so that the meat is pierced approximately every one-fourth inch even though the spacing of the needles is on 1/2 inch centers. This feature provides an increase in the area in the manifold head 146 for mounting the needles while providing a more concentrated injecting pattern in the meat. For best results, the spacing of the needles should not exceed five-eighths of an inch, whereupon the meat will be pierced approximately on 5/16 inch centers. In practice, the meat is usually advanced 1 ⅞ inches in each increment. By injecting a small amount of fluid into the meat on such close centers (one-fourth to five-sixteenths inch), the fluid need not migrate through the meat a long distance, and there will be no pockets of fluid building up in some areas while other areas have no fluid at all, as is the case with widely spaced needles, or needles which do not penetrate the meat in overlapping patterns. It is virtually impossible to inject fluid on ¼ inch to 5/16 inch centers without overlapping the penetration areas. As shown by the position of the bores 168 in FIG. 5, the positions of the needles in one row are staggered with respect to the positions of the needles in the next adjacent row. This permits the meat to be injected at points inbetween the initial points of injection as the meat is advanced a given increment.

As stated before, the fluid pump 256 is continually operated. When manifold 146 and valve 210 are lowered by the arms 80 and 82, piston 222 of valve 210 engages the element 259 which causes rod 220 to be raised or moved upwardly in valve 210 so that valve member 230 unseats from surface 234 which causes the fluid in compartment 236 to be forced into compartment 208, through pipe 206 and into compartment 202 of manifold 146. The fluid is forced from the manifold compartment 202 into the bores 168 and is forced outwardly from the injector needles through bores 182 thereof. As arms 80 and 82 are then moved upwardly, the valve member 230 is again lowered to its seating position on surface 234 which shuts off the supply of fluid to the manifold 146. In other words, fluid is supplied to the injector needles 174 only when the manifold 146 has been lowered so that the needles 174 are penetrating the meat product 288. The fact that fluid is only discharged from the needles 174 while the needles are in the meat product 288 results in less fluid being used than if fluid were continually discharged from the needles.

When valve member 230 is open, fluid will be pumped from pump 256 through pipe 257 and fitting 241, through pipe 258, into compartment 236, through compartment 208, pipe 206 and into compartment 202 for discharge from the needles 174. As the manifold is raised with respect to the meat, the valve member 230 closes thereby permitting compartment 236 to be pressurized with the fluid. The fluid is pumped into compartment 236 until check valve 242 operates to by-pass the same as will be explained hereinafter. As fluid pressure increases in compartment 236, the piston 287 is moved towards the left as viewed in FIG. 7 against the predetermined air pressure in the left end of chamber 285. In effect, the chamber 285 and piston 287 provide a surge chamber effect to the fluid in compartment 236. The movement of the piston 285 to the left as viewed in FIG. 7 causes the air in the left end of chamber 285 to be compressed. Upon valve member 230 opening, the compressed air in the left end of chamber 285 together with the air pressure exerted through pipe 291 causes the fluid in compartment 236 and the right end of chamber 285 to surge so that a large volume of fluid is supplied to the needles in an instantaneous manner. The accumulator arrangement of the piston 287, chamber 285 and compartment 236 provides a smooth operation while permitting the use of a much smaller fluid pump than ordinarily possible.

The amount of surge provided to the fluid depends upon the air pressure in pipes 291 and 269. The air pressure in pipe 269 normally causes plunger 267 to be in the position of FIG. 16 so that the fluid pump is pumping the fluid into compartment 236. When the pressure in compartment 236 reaches a level sufficient to overcome the air pressure in pipe 269, the plunger 267 moves to the right (as viewed in FIG. 16) so that ports 273 communicate with pipe 246 which causes the fluid to be recirculated to the reservoir 248. When the pressure drops in compartment 236, the air pressure in pipe 269 causes the plunger 267 to return to the position of FIG. 16 thereby causing fluid to again be furnished to the compartment 236 of valve 210.

Thus it can be seen that an extremely efficient method has been provided for injecting fluid into meat products which conserves the fluid being used, and which permits the uniform thorough injection of fluid into a meat product at closely located points of injection. Thus it can be seen that the method of this invention accomplishes at least all of its stated objectives.

I claim:

1. The method of injecting fluid into a meat product, comprising,
   providing a fluid injector needle means comprising a plurality of fluid injector needles,
   intermittently moving a meat product adjacent to and past the fluid injector needle means,
   penetrating the needles of said fluid injector means into said meat product between the periods of intermittent movement of said meat product,
   coordinating the increments of movement of said meat product with the effective width of said fluid injector needle means past which said meat product moves so that the effective penetration area of said meat product initially penetrated by said fluid injector needle means will at least partially overlap the effective penetration area of said meat product penetrated by said fluid injector needle means after the next successive movement of said meat product,
   each movement of said meat product being of a sufficient increment so that after said next successive movement of said meat product, the points of penetration of said needles in said overlapping penetration areas will be offset from the points of penetration of said needles during the next preceding penetration cycle so that said meat product will not be penetrated at the same point by any needles in said overlapping penetration areas of said meat product.

2. The method of claim 1 wherein each increment of movement of said meat product past said fluid injector needle means is slightly more than one-half the effective widths of said fluid injector needle means.

3. The method of claim 1 wherein fluid is forced through said needles only when said needles are penetrating said meat product.

4. The method of injecting fluid into a meat product, comprising, providing a fluid injector needle means comprising a plurality of fluid injector needles, intermittently moving a meat product adjacent to and past the fluid injector needle means, penetrating the needles of said fluid injector means into said meat product between the periods of intermittent movement of said meat product, coordinating the increments of movement of said meat product with the effective width of said fluid injector needle means past which said meat product moves so that the effective penetration area of said meat product initially penetrated by said fluid injector needle means will at least partially overlap the effective penetration area of said meat product penetrated by said fluid injector needle means after the next successive movement of said meat product, said fluid being forced through said needles only when said needles are penetrating said meat product.

5. The method of injecting fluid into a meat product comprising, injecting fluid into a meat product at a plurality of points which comprise an injection pattern, said injection pattern being defined by a plurality of laterally extending rows of injection points with the points in one line being offset laterally with respect to the injection points in each adjacent line whereby all the injection points can be closely centered with respect to each other, said meat product being injected a second time at a plurality of points substantially equi-distant from the points where said meat product was initially injected.

* * * * *